2,898,766
SINGLE AXIS TWO-GYRO STABILIZED PLATFORM

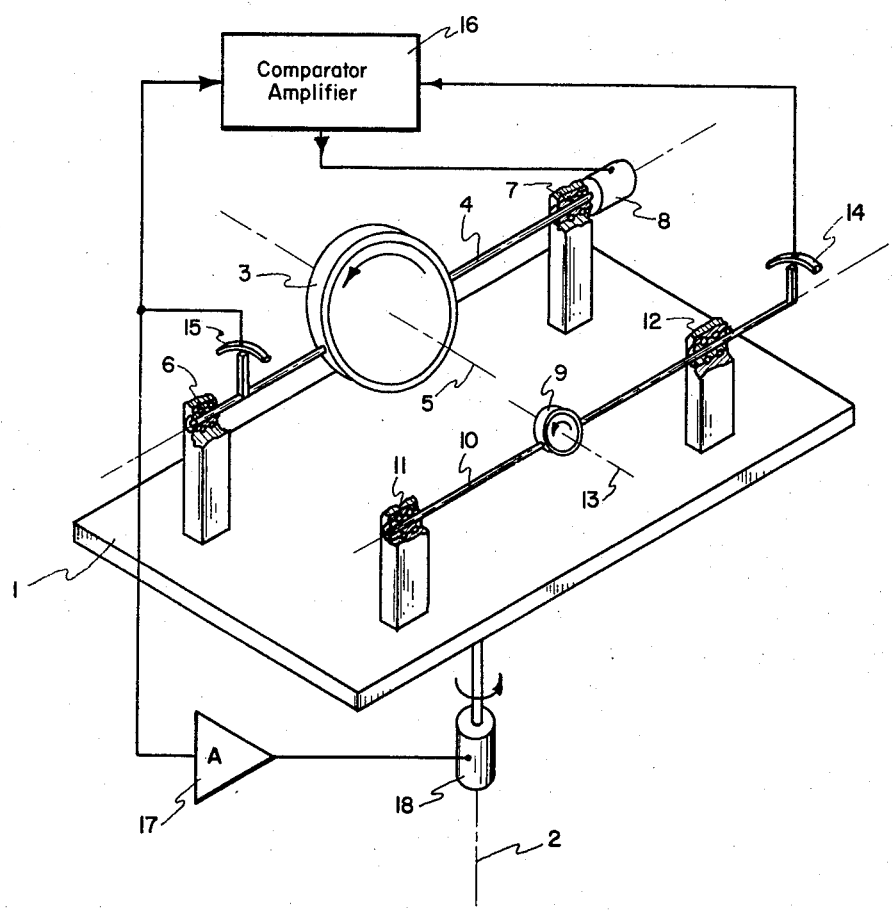

Roland Pittman, Grand Rapids, Mich., assignor to Lear, Incorporated

Application February 12, 1958, Serial No. 714,769

6 Claims. (Cl. 74—5.34)

This invention relates to gyroscopically stabilized reference platforms and particularly to a two-gyro stabilized reference platform of increased accuracy and stability under high frequency, large amplitude disturbing torques.

In the past, it has been conventional practice to employ a single gyro to stabilize each axis of a body required to be stabilized in space. By stabilization is meant the maintaining of a body in a fixed inertial orientation in space. When the body is stabilized about a single axis in space, the body does not rotate with respect to inertial space although neighboring bodies and connecting apparatus may rotate. The gyroscope has classically been chosen for the function of providing the torque necessary to stabilize a body in space because the gyroscope has the property of maintaining its spin axis fixed in space unless disturbing torques are applied about an axis angularly displaced from its spin axis.

Typically, a body to be stabilized about a single input axis has mounted upon it a single gyroscope having an input axis about which the body is to be stabilized, an output axis normal to the input axis, the output axis defining a single degree of angular freedom of the gyro with respect to the body and a spin axis normal to both of the aforementioned axes. It is conventional practice to provide an electrical pickoff to detect the precession of the gyroscope about its output axis which results from the application of torque to the input axis of the stabilized body and the gyroscope. This electrical pickoff generates a signal in proportion to the precession of the gyro about its output axis and this signal is ordinarily electrically amplified and utilized to drive a torque disposed upon the input axis of the body in the sense required to oppose the disturbing torque which tends to cause output axis precession of the gyroscope.

One of the problems encountered in the design of stabilized platforms for use in high performance aircraft and missiles as well as in gun laying equipment, has been that if a relatively large gyroscope is utilized to provide stabilization about a given axis in order to provide a relatively high angular momentum to oppose a disturbing torque, friction and other disturbing torques about the output axis of the gyro itself are likely to be of sufficient magnitude to cause serious deterioration of the total accuracy of stabilization. The basic cause of platform drift is most often established to be output axis torques and since these torques become larger as the size of the gyro becomes larger, some means must be found for their elimination. The straight-forward solution to the problem is that of making the gyro and its components more and more precise, eliminating to as great an extent as possible all friction about the output axis of the gyro and in other ways increasing to the maximum extent the accuracy of the instrument itself. The output axis disturbing torques, due to friction in particular, may be reduced by an increasing reduction of the size of the gyro. If the platform is designed for use in high performance aircraft or for use in gun laying equipment, it must be capable of absorbing high accelerations and large and sudden disturbing torques of various kinds. The only way that a platform can remain angularly undisplaced under such conditions is to provide a relatively large gyro wheel. If a large gyro wheel is used, the output axis disturbing torques are large and hard to eliminate.

This invention has as one of its objects the provision of a system wherein the advantage of a relatively small and relatively accurate gyro may be combined with the capabilities of a large but relatively imprecise gyro to achieve at once the high torquing capabilities of a large gyro with the inherent accuracy of a small gyro since a small gyro ordinarily has relatively low disturbing torques about its output axis but is incapable of exerting sufficient torque about the input axis of the platform to overcome the disturbing torques present under high acceleration and under shock conditions without encountering its limit stops. This invention contemplates torquing the input axis of the platform in response to the output of a first gyro and torquing the output axis of this first gyro in response to the difference between the output of the first gyro and the output of the second gyro located on the same platform with identical orientation as the first gyro, the second gyro being much smaller than the first gyro and hence relatively free from disturbing torques about its output axis.

Therefore, it is an object of this invention to provide means for stabilizing a body about a single axis with improved accuracy.

It is another object of this invention to provide gyroscope stabilizing equipment for a platform which has a quick and positive response to disturbing torque and relative freedom from drift.

It is another object of this invention to provide means for detecting output axis disturbing torques of a gyroscope.

Another object of this invention is to provide a gyroscope stabilization system in which one gyroscope monitors the operation of another gyroscope.

Other objects of the invention will become apparent from the following description when taken in conjunction with the accompanying single figure which is a schematic three-dimensional representation of the invention.

Referring to the single figure, a platform or other body 1 is to be stabilized about input axis 2. Gyroscope 3 is mounted on platform 1 with a single degree of angular freedom about axis 4 which is the output axis of gyroscope 3 and which axis is perpendicular to axis 2. Spin axis 5 of gyroscope 3 is mutually orthogonally disposed with respect to axes 2 and 4. Axis 4 is defined by bearings 6 and 7 fixed with respect to platform 1 but permitting rotation of gyroscope 3 about its output axis 4. The torquer 8 is mounted to provide torque to the gyroscope about output axis 4.

The second gyroscope 9 is similarly mounted on platform 1 with a single degree of angular freedom about its output axis 10 which is defined by bearings 11 and 12 mounted on platform 1. Spin axis 13 of gyroscope 9 is normal to axes 10 and 2 and parallel to spin axis 5 of gyroscope 3. Thus it can be seen that the two gyroscopes are identically mounted and oriented upon the platform.

Pickoff 14 detects angular motion of gyroscope 9 about its output axis 10 which results from torques disturbing the angular orientation of the gyroscope.

Signals from pickoffs 14 and 15 are fed to comparator amplifier 16 which produces an output signal proportional to the difference between the outputs of these pickoffs. This signal is fed to torquer 8 which applies a torque to the output axis of gyro 3 in the sense required to reduce this difference signal to zero. At the same time, the output signal from pickoff 15 is fed to amplifier 17 which in turn drives torquer 18 which drives the input axis 2 of the platform with a torque in the sense to reduce the output signal of the pickoff to zero.

In operation, the device functions as follows: Let us assume the application of the disturbing torque to the input to the platform. Since this torque is transmitted through the bearings of the two gyroscopes, these two gyroscopes will react by supplying to the platform a reactive torque equal to, but opposite in direction, to the disturbing torque. The magnitude of reactive torque supplied by these two gyroscopes will be in direct proportion to their relative angular momenta, that is, if one gyroscope is ten times as big as the other, it will supply ten times as much reactive torque as the other assuming, of course, that the elastic compliance of the bearings of the gyroscopes are comparable. In supplying this reactive torque, of course, both gyroscopes will precess about their output axes.

Because the gyroscopes furnish reactive torque, the platform actually remains undisturbed. Of course, it can be imagined that a sufficiently high disturbing torque could be applied to the platform to entirely overcome the reactive torque of both gyroscopes. However, as previously discussed, this invention contemplates the use of at least one of the gyroscopes of sufficiently large size so that its reactive torque is much higher than any disturbing torque which might be anticipated.

When the gyroscopes precess about their output axes, signals are generated in their respective pickoffs which result in the application of a torque to the platform of the opposite sense to the disturbing torque and of a magnitude equal to the disturbing torque so that the reactive torques from the gyroscope need no longer be supplied to stabilize the platform and the gyroscopes cease precession about their output axes. When the gyroscopes cease precession about their output axes, the output signals from the gyroscope pickoffs return to zero and the platform torquer 18 ceases to apply torque to the platform beyond what is needed to exactly balance at all times the disturbing torque.

It is possible that in precessing about its output axis in response to input axis torques upon the platform, gyroscope 3 may experience disturbing torques about its output axis 4. To the extent that this is the case, the output signals from pickoff 14 and 15 differ. This must be true because if there is a frictional torque about the output axis of gyroscope 3, the reaction thereto is transmitted through bearings 6 and 7 to the platform to bearings 11 and 12 and to gyroscope 9. Thus gyroscope 9 precesses about its output axis for two reasons: The first is disturbing torque about the input axis 2 of the platform and the second is disturbing torque about the output axis 4 of gyroscope 3. But gyroscope 3 is incapable of detecting torque about its own output axis so the output signal of pickoff 15 of gyroscope 3 is representative only of the disturbing torque applied about axis 2 of the platform. Therefore, if these two signals, that is the signal from pickoff 15 and the signal from pickoff 14 are subtracted, the net signal represents the precession axis disturbing torque about the output axis of gyroscope 3 which, as has been previously pointed out, is mainly responsible for the drift of the platform. It may be remarked that this difference signal is a true representation of the output axis disturbing torque of gyroscope 3 only to the extent of the accuracy of gyroscope 9. But as also previously pointed out, it is much easier to make a small gyroscope with relatively high precision and low output axis torque than to make a larger gyroscope of relatively high precession and low disturbing torque. Accordingly, gyroscope 9 effectively monitors the operation of larger gyroscope 3. On the other hand, gyroscope 3 provides the bulk of the reactive torque instantaneously required to maintain the platform in undisturbed orientation. This function cannot be performed by gyroscope 9 since it is of such low angular momentum that it would precess excessively before torquer 18 could apply a torque equal and opposite to the disturbing torque.

Although the present invention has been described with a certain degree of particularity, it is understood that various modifications in the details and arrangements of parts may be had without departing from the spirit and scope of the invention as hereinafter claimed:

I claim:

1. Means for stabilizing a body about a single input axis comprising a first gyroscope supported on said body and having a spin axis, an output axis, and an input axis oriented parallel to the input axis of said body, a second gyroscope supported on said body having axes disposed parallel to those of said first gyroscope, means torquing said body about its input axis in the direction to maintain at zero the angular displacement of said body about its input axis in response to output axis precession of said first gyroscope, and means torquing said first gyroscope about its output axis to maintain the difference between the output axis precessions of said two gyroscopes at zero.

2. A device as cited in claim 1 in which said first gyroscope is substantially larger than said second gyroscope.

3. Gyroscopically stabilized means comprising a frame supported with angular freedom about a single input axis, a first gyroscope supported on said frame with a single degree of angular freedom about an output axis normal to said input axis, a second gyroscope supported on said frame with a single degree of angular freedom about an output axis normal to said input axis, a first pickoff generating an electrical signal proportional to the relative angular displacement of said first gyroscope and said frame, a second pickoff generating an electrical signal proportional to the relative angular displacement of said second gyroscope and said frame, means torquing said frame to cause said first pickoff signal to become zero, and means torquing said first gyroscope about its axis of freedom with respect to said frame in response to the difference between said first and second pickoff signals.

4. A device as recited in claim 3 in which the angular momentum of said first gyroscope is more than twice that of said second gyroscope.

5. In a gyroscope stabilized platform, two single degree of freedom gyroscopes identically oriented on said platform, means for slaving the platform in response to precession of one of said gyroscopes about its output axis and means torquing said one gyroscope about its output axis in response to the difference between the precessions of said two gyroscopes.

6. Apparatus according to claim 5 in which the angular momentum of said one gyroscope is at least twice that of the other said gyroscope.

References Cited in the file of this patent

UNITED STATES PATENTS 2,320,354    Fedde _____ June 1, 1943